United States Patent [19]
Glitten

[11] Patent Number: 4,622,945
[45] Date of Patent: Nov. 18, 1986

[54] ELEVATABLE COOKING DEVICE

[76] Inventor: John A. Glitten, 323 N. Nettleton, Bonner Springs, Kans. 66012

[21] Appl. No.: 778,899

[22] Filed: Sep. 23, 1985

[51] Int. Cl.[4] .............................................. F24B 3/00
[52] U.S. Cl. .................... 126/25 A; 126/30; 99/449; 248/523; 248/530; 248/533; 211/117; 211/119; 211/204; 211/190
[58] Field of Search ............ 126/25 A, 2 RR, 25 AA, 126/30, 29, 9 R, 9 B, 137, 333; 99/393, 421 H, 449, 645; 248/523, 529, 530, 533, 321; 211/117, 118, 119, 204, 205, 190

[56] References Cited
U.S. PATENT DOCUMENTS

| | | | |
|---|---|---|---|
| 750,742 | 1/1904 | Weston | 126/30 |
| 2,472,164 | 6/1949 | Mannheimer | 126/25 A |
| 2,501,075 | 3/1950 | Miller | 126/30 X |
| 3,526,217 | 9/1970 | Garske et al. | 126/25 A |
| 4,206,741 | 6/1980 | Prigge | 126/25 A |

Primary Examiner—Randall L. Green
Attorney, Agent, or Firm—Thomas M. Scofield

[57] ABSTRACT

Improvements in outdoor cooking grills; an improved, vertically adjustable, food grill slideably mounted on a central vertical stake through a central collar on the grill; improvements in means for raising, lowering and fixing the vertical position of the grill on its mounting stake; a vertically adjustable grill with readily assembled and disassembled parts.

7 Claims, 9 Drawing Figures

ELEVATABLE COOKING DEVICE

BACKGROUND OF THE INVENTION

Many forms of vertically adjustable grills have been developed and proposed for use in outdoor barbecue and cooking situation, as well as for use in fireplaces. Such prior art grill constructions have incorporated various means and provisions for adjusting the height of the grill above the fire on the ground or in the fireplace, in order to regulate and control the rate of cooking. Further, various coupling and linking mechanisms have been used to secure the grill itself to an upstanding support in such use and function.

In one type of prior art grills, such are laterally positioned, outwardly and away from a vertical supporting member. In such case, the grill is typically mounted on and supported by an arm extending laterally from a central, upstanding support. The grill may be, further, commonly raised and lowered by some sort of vertical screw means. With respect to this type of prior art grill, there are also known various laterally extending grills wherein the supporting vertical member is driven into the ground with a stake, there being a variety of linkages and constructions employed to retain and attach the grill to the base supporting member.

In another type of prior art grill, such have been provided and designed with the grill itself more or less centered on an upstanding support. In these devices, the height of the grill is adjustable by various mechanisms and, typically, is fixable at a given vertical position on the support.

BRIEF DESCRIPTION OF THE INVENTION

The subject invention relates to an outdoor barbecue grill and particularly to such a grill which may be readily raised or lowered with respect to the ground level. This raising or lowering is effected by the use of a relatively simple chain winding mechanism. The grill itself is provided with a collar fixedly mounted within the periphery of the grill. This collar fits around and slideably moves on a normally vertical stake driven into the ground. A second collar carries an elongate, threaded rod fixed in position at the top of the stake and in a normally horizontal orientation. Means are provided associated with the elongate threaded rod and grill to constitute a chain winding mechanism.

Included in the means noted are a handle to rotate the elongate threaded rod, a stop for the rod to fix it at a given rotational position in the chain winding process and a chain connection whereby rotation of the threaded rod winds the chain (or unwinds it) with respect to the rod. One end of the chain is attached to the grill and one end to the threaded rod. A locking engagement is provided associated with the second collar to fix the rotational position of the threaded rod at a given chain length and grill height.

THE PRIOR ART

Many forms of vertically adjustable grills have been proposed for use in barbecue grills and in fireplaces with provisions for adjusting the height of the grill above the fire to regulate cooking rate and, with various coupling mechanisms to secure the grill to an upstanding support.

Grills have been laterally positioned from a vertical supporting member as in U.S. Pat. No. 2,608,149 by Ellis wherein the grill is mounted on a laterally extending arm from a central upstanding support and is raised and/or lowered by a vertical screw. Subsequent disclosures in the following patents show laterally extending grills with the supporting vertical member driven into the ground with a stake and with a variety of methods to retain and attach the grill to the supporting member:

Lucas U.S. Pat. No. 2,844,139, issued July 22, 1958 for "Portable Barbeque";

Lucas U.S. Pat. No. 2,912,973, issued Nov. 17, 1959 for "Portable Barbeque";

Lucas U.S. Pat. No. 3,152,536, issued Oct. 13, 1964 for "Portable Barbeque";

Anderson U.S. Pat. No. 3,344,780, issued Oct. 3, 1967 for "Portable Grill Device";

Nelson U.S. Pat. No. 3,834,370, issued Sept. 10, 1974 for "Assembly";

Van Grinsven et al U.S. Pat. No. 4,269,164, issued May 26, 1981 for "Swing-A-Way Camp Grill"; and Ivy U.S. Pat. No. 4,351,312, issued Sept. 28, 1982 for "Portable Campfire Grill Assembly".

Grills have also been designed with the grill more or less centered on the upstanding support with the height of the grill being adjustable and fixed to a position on the support:

White U.S. Pat. No. 2,637,313, issued May 5, 1953 for "Adjustable Grill";

Petrie U.S. Pat. No. 3,261,344, issued July 19, 1966 for "Portable Barbecue and Camp Cooker".

OBJECTS OF THE INVENTION

A first object of the invention is to provide an outdoor grill device with a simple and reliable mechanism to raise and lower the grill to meet a variety of cooking requirements.

Another object of the present invention is to provide a simple portable grill that can be raised and lowered with a novel chain winding mechanism without exposing the user to the risk of burns from the fire.

Another object of the present invention is to provide a simple portable grill that can be easily raised and lowered at any time with a fire burning underneath the grill.

Another object of the present invention is to provide a simple portable grill that is supported on a center stake mounted in the ground.

Another object of the invention is to provide an outdoor grill which is economical to manufacture and can be assembled from readily available standard materials.

Another object of the invention is to provide an improved portable grill assembled that is lightweight and easy to transport, assemble and disassemble.

Another object of the present invention is to provide a simple portable grill that when assembled is very sturdy and robust.

Another object of the present invention is to provide a portable grill that is simple to construct and economical to manufacture.

Another object of the present invention is to provide a simple stake driving guide to position and locate a stake to be driven into the ground upon which to mount a portable grill.

Still another object of the invention is to provide a portable grill assembly with an open mesh design for broiling or for boiling foods in other containers.

Other and further objects of the invention will appear in the course of the following description thereof.

THE DRAWINGS

In the drawings, which form a part of the instant specification and are to be read in conjunction therewith, embodiments of the invention are shown and, in the various views, like numerals are used to indicate parts.

DESCRIPTION OF PREFERRED EMBODIMENT

Figure 1:
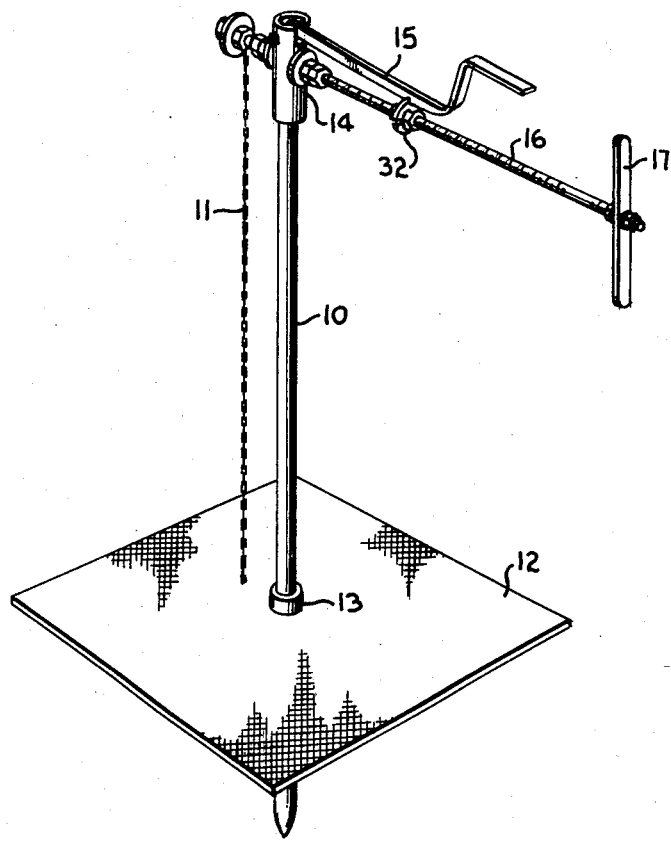
FIG. 1 is a three-quarter perspective view, from above, of the assembled invention with the cooking screen positioned at a lower level.

FIG. 1 is a perspective view of the assembled grill in accordance with the present invention. The grill assembly comprises an elongate stake 10 which may be conveniently formed from a suitable length of metal rod or metal tubing and is placed into the ground with or without the aid of a sharpened end. The grill 12 is optionally of rectangular shape and can be fabricated from expanded metal safety mesh, without the necessity for any additional bracing, to provide a grid structure upon which articles of food and/or containers can be conveniently supported to be cooked. A first annular collar 13 is secured within the periphery of the grill and preferentially located to balance the grill in a horizontal position for cooking. Collar 13 is mounted on stake 10 to permit grill 12 to longitudinally slide up and down and stake, thus permitting the grill to be raised and lowered to adjust the heat of the fire with respect to the food to be cooked. Grill 12 is raised and lowered on the stake by a sash chain 11 which is attached to the grid at its lower end by an S hook 18 and at its upper end to a winding rod 16. Rod 16 is mounted on top of the stake 10 via a loose fitting annular collar 14. Winding rod 16 is secured in loose fitting openings 25 in the annular collar 14 and overlies and is supported on top of the stake 10. During cooking, the grill 12 is fixed in position by a crank handle shape locking bar 15.

Figure 2:
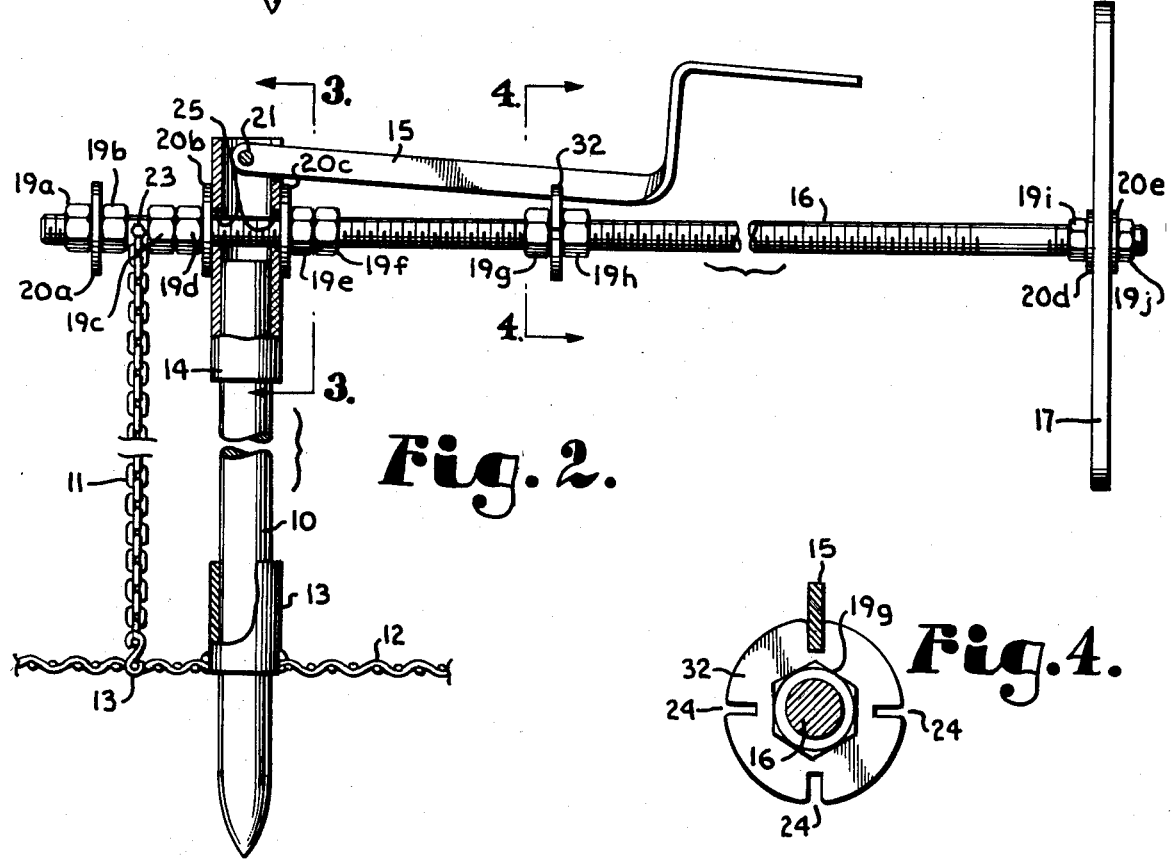
FIG. 2 is an enlarged, side, partly sectional view of the assembled device of FIG. 1 with the construction of the elevation and lowering mechanism detailed.

FIG. 2 shows the structure of the crank assembly which raises and lowers the grill 12. The crank assembly consists of an elongated, threaded normally horizontal rod 16 with an insulated or wooden handle 17 attached to one end by flat washers 20d, e and secured on the threaded rod 16 by lock nuts 19i, j. Second annular collar 14 has openings 25 in its upper wall of sufficient diameter to permit rod 16 to freely slide therethrough and to be positioned as described below. The lower end of annular collar 14 is of sufficient length to be securely slipped over and securely engage stake 10 with the top of stake 10 abutting against the threaded rod 16. The lower end of stake 10 is preferably pointed for easy penetration into the ground a sufficient depth to support the weight of the grill and winding mechanism. Since the only purpose of the thread on rod 16 is to engage the retaining nuts 19 a–j inclusive to be described below, it doesn't make any difference if the top of stake 10 contacts rod 16 or if the threads on the rod portion thereover are damaged by contact with the stake itself. The cranking mechanism is thus freely supported by the stake 10.

Two washers 20b and 20c are positioned on each side of the annular collar 14 and are locked in position on threaded rod 16 by retaining nuts 19c, d, e, f. The retaining nuts 19c, f so lock the washer and nut assembly mounted onto the threaded rod 16 as to permit a loose clearance between the annular collar 14 and the retaining washers 20b and 20c. When the handle 17 is turned, the rod 16 easily rotates inside collar 14 without any appreciable friction because of the slow speed. Both the lateral displacement of the handle 17 relative to the fire and its material of construction overcome the previous problems of other devices faced by other user in necessarily reaching in over the fire to reposition the grill.

Sash chain 11 is attached to threaded rod 16 by a machine screw 23 mounted in a drilled hole on the extremity of the rod opposite to the handle and adjacent to the locknuts and washer combination of 19a, b 20a. The four nuts 19a, b, c, d and the two locking washers 20a, b form a guide to receive and position the chain 11 as it is wound onto the rod 16 by rotating handle 17.

Figure 3:
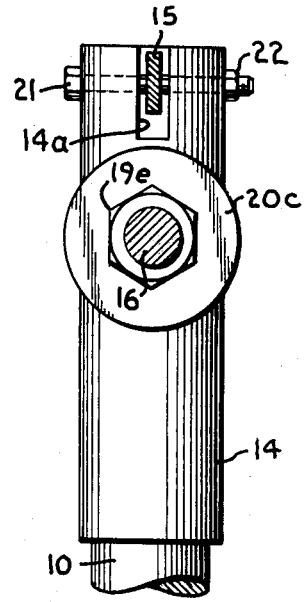
FIG. 3 is a view taken along the line 3—3 of FIG. 2 in the direction of the arrows.

The crank handle locking bar 15, operative to restrain the grill in a selected vertical position, is hinged in the center of the annular collar 14 by a retaining bolt and nut 21, 22 and shown in FIG. 3 and is free to pivot in a vertical plane parallel with the axis of stake 10 to engage or disengage slotted washer 32. Slot 14a is provided in second annular collar 14. The horizontal rod 16 is locked at any given rotational position, with the chain 11 either fully or partly extended up or down, by engaging crank handle 15 in the fourway slotted washer 32. The latter is restrained in position on rod 16 by locking nuts 19g, h positioned on either side of washer 32.

Figure 4:
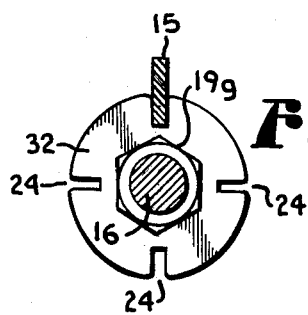
FIG. 4 is a view taken along the line 4—4 of FIG. 2 in the direction of the arrows.

FIG. 4 shows how the locking bar 15 is received in one of the slots 24 of the fourway slotted washer 32 which is positioned on the threaded rod 16 by the lock nuts 19g and 19h.

Figure 5:
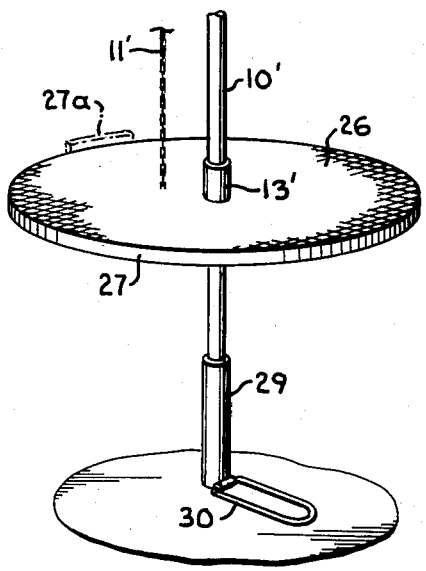
FIG. 5 is a partly sectional elevational view of the grill mesh in an alternative circular form and the stake driving guide used to locate the stake in position for the stake to be driven into the ground.

FIG. 5 shows an alternate form of the grid constructed of expanded safety mesh 26 in a circular pattern with the annular collar 13 located centrally thereof. The mesh is supported by a ring 27 at its circumference. The central stake 10 is received at its lower end in a tube 29 having hinged stirrup 30 fixed thereto.

Figure 6:
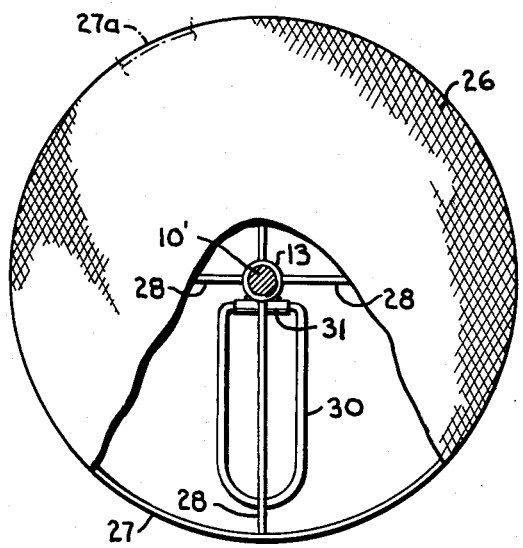
FIG. 6 is a vertical plan view of the circular mesh grill form and stake driving guide of FIG. 5 with parts cut away to better illustrate the structure.

FIG. 6 shows a plan view of a circular mesh form of grill braced by a plurality of cross members 28 attached to the annular collar 13 to support the mesh 26. The foot stand stake driving guide 30 is shown in a horizontal position for supporting the grill while the stake is driven into the ground.

Figure 7:
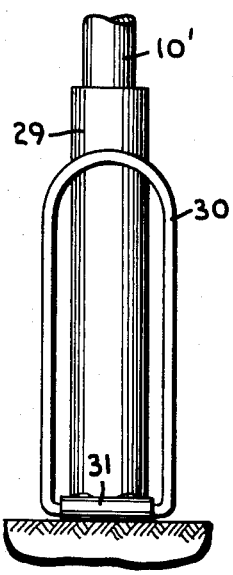
FIG. 7 is an end view of the stake driving guide prior to use.
Figure 8:
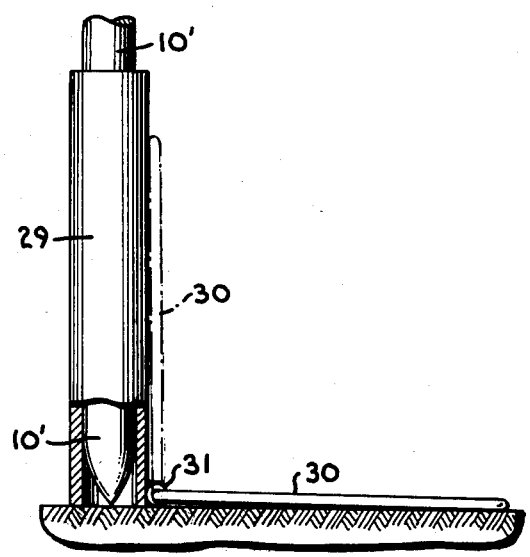
FIG. 8 is a side view of the device of FIG. 7 with parts cut away showing the stake driving guide in use.
Figure 9:
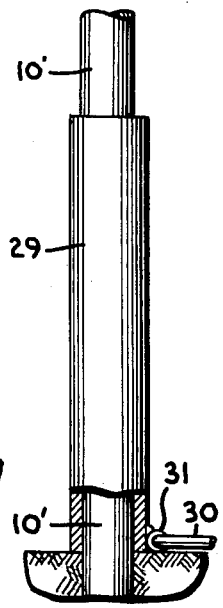
FIG. 9 is a view like FIG. 8 where the stake has been driven into the ground.

FIGS. 7, 8 and 9 illustrate several views of the stake driving guide with stake 10 inserted in the supporting and retaining tube 29 and the stirrup 30 positioned in both vertical and horizontal positions. The stirrup 30 is typically manufactured from steel rod formed into a rectangular shape with the ends butted together to form a simple hinge engaging a collar 31 welded to the pipe 29.

In use in installation, stake 10 is placed in the orienting pipe 29 and stirrup 30 is unfolded to lie on the ground as shown in FIG. 8. The user places a foot on stirrup 30 to locate the shaft in a fixed and rigid position while the stake is driven into the ground as shown in FIG. 9.

In use, the grill 12 is laid on the ground where it is desired that the fire be made. The stake 10 is driven through the collar 13, with or without the aid of the stake driving guide, to the desired depth in the ground required or alternatively, the stake may be driven into the ground and the grill thereafter slid downwardly upon it. The cranking assembly is then mounted on top of the stake 10 by engaging secondary collar 14 with the top of stake 10. This abuts the horizontal cranking assembly within the collar 14 on the top of stake 10. Chain 11 is unrolled down to grill 12 which is engaged with the S hook 18. At this point the grill 12 can be wound up to its full height where it abuts the bottom of the collar 14 on the top of the stake 10. During the windup, locking bar 15 is held up free of the slots of the engaging washer 32 and remains so until the grill 12 has been fully wound up. A fire is then built and lit around stake 10; such fire may be housed in a confined area surrounded by stones for reasons of safety. When the fire has reached the required intensity, or, alternatively, burnt down to the desired level, grill 12 is slowly lowered downwardly and positioned at the desired level appropriate for the food to be cooked. The locking bar 15 is then fixed in its new position by engaging the bar with the slotted washer 32. When the cooking is done, the grill may be either lowered onto the fire for confinement purposes or, alternatively, the grill raised and by removal of the parts from stake 10 disassembled into its component pieces and removed.

With respect to FIG. 5, it should be understood that the rim or ring 27 may be extended above the level of the mesh 26 a sufficient distance to act as a food retainer. Such may be particularly useful in grilling round or cylindrical food items such as hot dogs. It may also be noted that the annular collar 14 and grill collar 13 permit rotation of the grill (and winding apparatus) around stake 10 by movement of shaft 16 in a clockwise or counterclockwise direction around the stake 10. This enables the user to move ready foodstuffs to a hotter or colder area of the underlying fire while still being able to maintain the same grill height to treat other foods.

It is not necessary for rod 16 to be threaded. However, if rod 16 is not threaded, nuts 19a, 19b, 19c and 19d, 19e and 19f, 19g and 19h, as well as 19i and 19j must be replaced by spot welds for the washers 20a, 20b, 20c, 32, 20d and 20e or the equivalent.

From the foregoing, it will be seen that this invention is one well adapted to attain all of the ends and objects hereinabove set forth together with other advantages which are obvious and which are inherent to the invention.

It will be understood that certain features and subcombinations are of utility and may be employed without reference to other features and subcombinations. This is contemplated by and within the scope of the claims.

As many possible embodiments may be made of the invention without departing from the scope thereof, it is understood that all matter herein set forth or shown in the accompanying drawings is to be interpreted as illustrative and not in a limiting sense.

I claim:

1. A grill assembly comprising, in combination:
   (1) an elongate, normally vertical supporting stake of substantially uniform cross-sectional size and shape throughout the substantial upper portion of its length,
   (2) an openwork grill normally mounted on said stake at right angles thereto in a position substantially parallel to the supporting level ground,
   (3) a first annular collar secured within the periphery of said grill in normally vertical orientation and of sufficient inside diameter for friction sliding fit on the outer surface of said stake,
   (4) an elongate, normally horizontal threaded rod of substantially uniform cross-section in its substantial entire length,
   (5) a handle of insulating material secured to said threaded rod adjacent to one end of said rod,
   (6) a chain having one end thereof fixed adjacent to the other end of said rod, the other end of said chain connected to said grill,
   (7) a slotted ring fixed to said threaded rod on the handle side of the latter,
   (8) a second annular collar mounted on the upper end of said stake, said collar provided with suitable size, opposed openings therethrough to permit the mounting and extension of said rod thereon and therethrough, said collar openings not threadably engageable with said rod,
   (9) means on said threaded rod cooperating between said second annular collar and those portions of the threaded rod adjacent the second collar on each side thereof:
      (i) to cause a portion of the threaded rod to continuously overlie the top end of said stake,
      (ii) to support said second collar, said rod and attachments to said second collar with respect to the top end of said stake and
      (iii) to permit the rotation of said rod in said collar openings to wind up and down the chain thereby to raise and lower said grill,
   (10) a locking bar pivotally mounted and secured at one end on said second collar and operative to pivot in a vertical plane parallel to the axis of said rod in such manner so as to be able to engage and disengage the slots in said slotted ring, thereby to vertically fix the position of said grill with respect to said stake.

2. A device as in claim 1 wherein the grill is fabricated from expanded metal mesh of such strength and rigidity that said material does not require bracing to retain the desired shape of the grill and to support the weight of the foodstuffs to be cooked.

3. A device as in claim 1 wherein the grill is fabricated from expanded metal mesh of such limited strength and rigidity that said mesh requires bracing to secure the material in a frame outlining the desired shape of the grill and to support the weight of the foodstuff to be cooked.

4. A device as in claim 1 wherein said stake is formed from hollow tubing material of sufficient strength and wall thickness to enable the performance of the desired functions with less weight.

5. A device as in claim 1 and further comprising a stake driving mechanism comprising,
   (1) a hollow tube of sufficient strength, inside diameter and length to support and retain said stake vertically mounted inside thereof in such fashion as to permit such stake to be driven into the ground, (2) there being a foot stand hinged to the bottom of said tube and operative to pivot in a vertical plane parallel to the axis of said tube, said foot stand positioned horizontally on the ground in use to vertically orient said tube while said stake is driven into the ground.

6. A grill assembly comprising, in combination:
(1) an elongate, normally vertical supporting stake of substantially uniform cross-sectional size and shape throughout the substantial upper portion of its length,
(2) an open work grill normally mounted on said stake at right angles thereto in a position substantially parallel to the supporting level ground,
(3) a first annular collar secured within the periphery of said grill in normally vertical orientation and of sufficient inside diameter for friction sliding fit on the outer surface of said stake,
(4) a second annular collar mounted on the upper end of said stake, said collar having a pair of opposed openings in the upper wall portion thereof,
(5) an elongate, normally horizontal threaded rod of substantially uniform cross-section in its substantial entire length,
(6) said rod received in and through said second annular collar openings adjacent one end of said rod,
(7) means fixing the position of said rod with respect to said second collar in rotatable fashion therethrough,
(8) a handle of insulating material secured to said threaded rod adjacent to one end of said rod,
(9) a chain having one end thereof fixed adjacent to the other end of said rod, the other end of said chain connected to said grill,
(10) a slotted ring fixed to said threaded rod on the handle side of the said rod, and
(11) a locking bar pivotally mounted and secured at one end on said second collar and operative to pivot a vertical plane parallel to the axis of said rod in such manner so as to be able to engage and disengage the slots in said slotted ring, thereby to variably and vertically fix the position of said grill vertically with respect to said stake,
(12) a portion of the threaded rod continuously overlying the top end of said stake in such manner as to permit the rotation of said rod in said collar openings to wind up and down the chain, thereby to raise and lower said grill upon rotation of said handle.

7. A grill assembly comprising, in combination:
(1) an elongate, normally vertical supporting stake of substantially uniform cross sectional size and shape throughout the substantial upper portion of its length,
(2) an open work grill normally mounted on said stake at substantial right angles thereto in a position substantially parallel to the supporting level ground,
(3) a first annular collar secured within the periphery of said grill in normally vertical orientation and of sufficient inside diameter for a friction sliding fit on the outer surface of said stake,
(4) engaging means mounted on the upper end of said stake, said engaging means having a pair of opposed openings in the upper wall portion thereof,
(5) an elongate, normally horizontal rod of substantially uniform cross section in its substantial entire length,
(6) said rod received in and through said pair of opposed openings in the upper wall portion of said engaging means adjacent one end of said rod,
(7) means fixing the axial position of said rod with respect to said engaging means in rotatable fashion therethrough,
(8) a handle of insulating material secured to said rod adjacent to one end of said rod,
(9) a chain having one end thereof fixed adjacent to the other end of said rod, the other end of said chain connected to said grill,
(10) means fixed to said rod intermediate the handle and the said engaging means adapted for radial engagement thereof at a plurality of positions, and
(11) means pivotally mounted and secured at one end on said engaging means and operative to pivot in a vertical plane parallel to the axis of said rod in such manner as to be able to radially engage and disengage said last means, thereby to variably and vertically fix the position of said grill vertically with respect to said stake,
(12) a portion of the rod continuously overlying the top end of said stake in such manner as to permit the rotation of said rod in said engaging means to wind up and down the chain, thereby to raise and lower said grill upon rotation of said handle.

* * * * *